(12) United States Patent
Liao et al.

(10) Patent No.: US 12,209,355 B2
(45) Date of Patent: Jan. 28, 2025

(54) THERMALLY INSULATING SiC-BN AEROGEL FELT AND PREPARATION METHOD AND USE THEREOF

(71) Applicant: YANGTZE RIVER DELTA RESEARCH INST (QUZHOU), UESTC, Quzhou (CN)

(72) Inventors: Jiaxuan Liao, Quzhou (CN); Lichun Zhou, Quzhou (CN); Pengkai Tang, Quzhou (CN)

( * ) Notice: Subject to any disclaimer, the term of this patent is extended or adjusted under 35 U.S.C. 154(b) by 0 days.

(21) Appl. No.: 18/273,253

(22) PCT Filed: Jun. 1, 2023

(86) PCT No.: PCT/CN2023/097715
§ 371 (c)(1),
(2) Date: Jul. 19, 2023

(87) PCT Pub. No.: WO2024/169081
PCT Pub. Date: Aug. 22, 2024

(65) Prior Publication Data
US 2024/0401263 A1 Dec. 5, 2024

(30) Foreign Application Priority Data

Feb. 13, 2023 (CN) .......................... 202310142449.0

(51) Int. Cl.
*B01J 13/00* (2006.01)
*C04B 35/624* (2006.01)
(Continued)

(52) U.S. Cl.
CPC ......... *D06M 10/06* (2013.01); *B01J 13/0091* (2013.01); *C04B 35/624* (2013.01); *C04B 35/6264* (2013.01); *C04B 35/62655* (2013.01); *C04B 35/62849* (2013.01); *C04B 35/62886* (2013.01); *C04B 35/64* (2013.01); *C04B 35/80* (2013.01); *D06M 10/02* (2013.01); *D06M 10/08* (2013.01); *C04B 2235/3409* (2013.01); *C04B 2235/3418* (2013.01); *C04B 2235/386* (2013.01); *C04B 2235/5244* (2013.01); *C04B 2235/5248* (2013.01); *C04B 2235/5256* (2013.01); *C04B 2235/5409* (2013.01); *C04B 2235/5436* (2013.01); *C04B 2235/606* (2013.01); *C04B 2235/616* (2013.01); *C04B 2235/6567* (2013.01);
(Continued)

(58) Field of Classification Search
CPC ................................... B01J 13/0091
See application file for complete search history.

(56) References Cited

U.S. PATENT DOCUMENTS

2024/0199498 A1* 6/2024 Lenz ................ C04B 35/62884

* cited by examiner

*Primary Examiner* — Austin Murata
(74) *Attorney, Agent, or Firm* — Sandy Lipkin (57) ABSTRACT

Disclosed are a thermally insulating SiC—BN aerogel felt, a preparation method and use thereof. The preparation method includes: heating and mixing a nitrogen source, a boron source, a solvent, and a silica aerogel powder to obtain a hot mixture, wherein the solvent is capable of dissolving the nitrogen source and the boron source; impregnating a graphite felt in the hot mixture, and cooling to obtain a gel felt; removing the solvent from the gel felt to obtain an aerogel felt; and in a protective atmosphere or in vacuum, heating the aerogel felt for a pyrolytic reaction to obtain the thermally insulating SiC—BN aerogel felt.

15 Claims, 3 Drawing Sheets

(51) Int. Cl.
*C04B 35/626* (2006.01)
*C04B 35/628* (2006.01)
*C04B 35/64* (2006.01)
*C04B 35/80* (2006.01)
*D06M 10/02* (2006.01)
*D06M 10/06* (2006.01)
*D06M 10/08* (2006.01)
*D06M 101/40* (2006.01)

(52) U.S. Cl.
CPC ................ *C04B 2235/6581* (2013.01); *C04B 2235/9607* (2013.01); *D06M 2101/40* (2013.01); *D06M 2200/30* (2013.01)

THERMALLY INSULATING SiC-BN AEROGEL FELT AND PREPARATION METHOD AND USE THEREOF

CROSS REFERENCE TO RELATED APPLICATION

This patent application is a national stage application of International Patent Application No. PCT/CN2023/097715, filed on Jun. 1, 2023, which claims the benefit and priority of Chinese Patent Application No. CN202310142449.0 filed with the China National Intellectual Property Administration on Feb. 13, 2023 and entitled "Thermally Insulating SiC—BN Aerogel Felt and Preparation Method and Use thereof". The disclosure of the two applications are incorporated by references herein in their entirety as part of the present application.

TECHNICAL FIELD

The present disclosure belongs to the technical field of composite materials, and particularly relates to a thermally insulating SiC—BN aerogel felt, and a preparation method and use thereof.

BACKGROUND

New energy vehicles frequently encounter fire accidents, owing to the rapid temperature rise of traction battery cells under the influence of mechanical, electrical, thermal and other factors, releasing a large amount of heat to the surroundings, which can trigger the combustion of battery cells, battery packs, and the entire vehicle, posing a threat to people's life safety. Therefore, the assembly of thermally insulating and flame-retardant materials between traction battery cells can effectively block the spread of combustion and prevent safety accidents from occurring. Also, thermally insulating and flame-retardant materials can provide heat preservation for traction batteries, thereby solving problems such as reduced traction battery capacity and shortened cycle life due to overcooling. Herein, aerogel has better thermal insulation and flame-retardant capabilities and lower density than conventional thermal insulation materials, making it an ideal material for thermal management of traction batteries.

As a multifunctional aerogel, silica aerogel, like other aerogels, has the defects of poor mechanical properties, such as high brittleness and easy damage during use. Additionally, its thermal conductivity significantly increases at a temperature exceeding 600° C. To overcome these limitations, according to current reports, boric acid and melamine with a molar ratio of 2:1 are dissolved in a mixed solvent of water and tert-butanol with a volume ratio of 5:7, and the resulting mixture is then heated and stirred at 85° C. for about 30 min until a transparent hot solution is obtained; while sonicating, the transparent hot solution is cooled to 30° C. to obtain a white hydrogel. Subsequently, the hydrogel is freeze-dried to obtain an M·2B precursor, which is finally held at 1,200° C. for 3 h in an $NH_3$ atmosphere to obtain a bulk boron nitride (BN) aerogel with a high specific surface area. With certain elasticity, this aerogel overcomes the problems of high brittleness and difficult tailoring of the aerogel. Based on this, Chinese Patent Application No. CN202110413296 further improves the flexibility of the BN aerogel. Specifically, a boron source precursor and a nitrogen source precursor are dissolved in a solvent to obtain a precursor solution: the precursor solution is introduced into an internal network of a fiber reinforcement to obtain a fiber-reinforced precursor solution composite; through solvent-induced and/or temperature-induced sol-gel transition, a fiber-reinforced precursor composite hydrogel is obtained; finally, the fiber-reinforced precursor composite hydrogel is dried and subjected to high-temperature pyrolysis to obtain a fiber-reinforced BN aerogel. The fiber reinforcement used in the above patent reference includes glass fiber, polyacrylonitrile-based stabilized fiber, carbon fiber, polyacrylonitrile fiber, silica fiber, mullite fiber, and alumina fiber, etc. However, these fibers not only have poor temperature resistance in the air, but also have high thermal conductivity, and once being composited with BN aerogel, will reduce the thermal insulation performance of the composite.

SUMMARY

An object of the present disclosure is to provide a thermally insulating SiC—BN aerogel felt, a preparation method and use thereof. SiC nanofiber in the thermally insulating SiC—BN aerogel felt according to the present disclosure improves mechanical and high temperature resistant properties of the aerogel felt, thereby resulting in good thermal insulation, flame retardance, and ultra-high temperature resistance, along with good flexibility and tailorability.

To achieve the above object, the present disclosure provides the following technical solutions.

The present disclosure provides a method for preparing a thermally insulating SiC—BN aerogel felt, including the following steps:

heating and mixing a nitrogen source, a boron source, a solvent, and a silica aerogel powder to obtain a hot mixture, wherein the solvent is capable of dissolving the nitrogen source and the boron source;

impregnating a graphite felt in the hot mixture, and cooling to obtain a gel felt;

removing the solvent from the gel felt to obtain an aerogel felt; and in a protective atmosphere or in vacuum, heating the aerogel felt for a pyrolytic reaction to obtain the thermally insulating SiC—BN aerogel felt.

In some embodiments, the nitrogen source is one or more selected from the group consisting of dicyandiamide, $(NH_4)_2SO_4$, melamine, and urea: the boron source is one or more selected from the group consisting of boron trioxide, ammonium borate, borax, boric acid, and $NaBH_4$; the solvent is a mixed solvent that includes water and a hydroxyl compound, the hydroxyl compound including one or more selected from the group consisting of methanol, ethanol, ethylene glycol, benzyl alcohol, tert-butanol, phenol, and cresol; and a molar ratio of the nitrogen source, the boron source and the water in the mixed solvent is in a range of (1-5):(0.2-6):(70-750).

In some embodiments, a temperature of the hot mixture is in a range of 80-95° C.:

the impregnating is performed by ultrasonic concussion-assisted impregnation, and the ultrasonic concussion-assisted impregnation is conducted for 1-20 min; and the cooling is conducted at a temperature of −196° C. to 60° C.

In some embodiments, the silica aerogel powder includes a single-component silica aerogel and/or a silica composite aerogel; and a mass ratio of the silica aerogel powder to the boron source is in a range of (1-10):(1-10).

In some embodiments, the graphite felt includes any one selected from the group consisting of an asphalt-based graphite felt, a polyacrylonitrile-based graphite felt, and a viscose-based graphite felt.

In some embodiments, the graphite felt has a specific surface area of 100-1,500 m²/g and a bulk density of 0.05-0.5 g/cm³.

In some embodiments, a means for removing the solvent includes any one or a combination of at least two selected from the group consisting of supercritical drying, ambient pressure drying, and freeze-drying: the ambient pressure drying is conducted at a temperature of 80-150° C. for 24-72 h: the freeze-drying is performed by pre-freezing at a temperature of −80° C. to 0° C. for 1-12 h, and then freeze-drying for 12-72 h; and the supercritical drying is conducted at a temperature of 35-45° C. and a pressure of 9-14 MPa for 8-36 h.

In some embodiments, the protective atmosphere is one or more selected from the group consisting of argon atmosphere, nitrogen atmosphere, and ammonia atmosphere; and the pyrolytic reaction is conducted at a temperature of 1,050-1,650° C. for 0.5-4 h.

The present disclosure provides a thermally insulating SiC—BN aerogel felt prepared by the method according to the foregoing technical solutions, including a felt formed by graphite and SiC nanofibers, and BN supported on the felt.

The present disclosure provides use of the thermally insulating SiC—BN aerogel felt according to the foregoing technical solutions as a thermally insulating and flame-retardant material.

The present disclosure provides a method for preparing a thermally insulating SiC—BN aerogel felt, including the following steps: heating and mixing a nitrogen source, a boron source, a solvent, and a silica aerogel powder to obtain a hot mixture, wherein the solvent is capable of dissolving the nitrogen source and the boron source; impregnating a graphite felt in the hot mixture, and cooling to obtain a gel felt; removing the solvent from the gel felt to obtain an aerogel felt; and in a protective atmosphere or in vacuum, heating the aerogel felt for a pyrolytic reaction to obtain the thermally insulating SiC—BN aerogel felt. The method according to the present disclosure introduces the silica aerogel and the graphite felt, so that the silica aerogel can undergo pyrolysis under heating to yield SiO and CO gases, which react with the graphite felt: $SiO\,(g)+2C(s)\rightarrow SiC(s)+CO\,(g)$, and $SiO_2\,(s)+CO\,(g)\rightarrow SiO\,(g)+CO_2\,(g)$, thus generating SiC nanofibers. The remaining incompletely reacted graphite and the resulting SiC nanofibers constitute a felt. Meanwhile, the nitrogen source and boron source react under heating to yield BN, which is supported on the formed felt to obtain the SiC—BN aerogel felt. The SiC nanofibers generated in the present disclosure can improve the mechanical properties and high temperature resistant properties of the aerogel felt. Therefore, the SiC—BN aerogel felt prepared by the method according to the present disclosure has good thermal insulation, flexibility, tailorability, flame retardance, and ultra-high temperature resistance, and overcomes pain points of aerogel felts on the market, such as powder shedding and difficulty in long-term use at high temperatures.

Further, in some embodiments of the present disclosure, the nitrogen source is one or more selected from the group consisting of dicyandiamide, $(NH_4)_2SO_4$, melamine, and urea; the boron source is one or more selected from the group consisting of boron trioxide, ammonium borate, borax, boric acid, and $NaBH_4$; the solvent is a mixed solvent that includes water and a hydroxyl compound, the hydroxyl compound including one or more selected from the group consisting of methanol, ethanol, ethylene glycol, benzyl alcohol, tert-butanol, phenol, and cresol; and a molar ratio of the nitrogen source, the boron source and the water is in a range of (1-5):(0.2-6):(70-750). The present disclosure uses inexpensive nitrogen and boron sources as raw materials for gel, and the method omits a solvent displacement link, shortens a preparation cycle, and reduces preparation costs.

The present disclosure provides a thermally insulating SiC—BN aerogel felt prepared by the method according to the foregoing technical solutions, including a felt formed by graphite and SiC nanofibers, and BN supported on the felt. The aerogel according to the present disclosure combines a felt containing SiC nanofibers with BN. By using the SiC—BN aerogel, which is formed by SiC nanofibers assisted with BN, the mechanical properties and high temperature resistant properties of the aerogel felt can be improved.

DETAILED DESCRIPTION OF THE EMBODIMENTS

The present disclosure provides a method for preparing a thermally insulating SiC—BN aerogel felt, including the following steps:

heating and mixing a nitrogen source, a boron source, a solvent, and a silica aerogel powder to obtain a hot mixture, wherein the solvent is capable of dissolving the nitrogen source and the boron source;

impregnating a graphite felt in the hot mixture, and cooling to obtain a gel felt;

removing the solvent from the gel felt to obtain an aerogel felt; and in a protective atmosphere or in vacuum, heating the aerogel felt for a pyrolytic reaction to obtain the thermally insulating SiC—BN aerogel felt.

In the present disclosure, unless otherwise specified, all raw materials/components for preparation are commercially available products well known to those skilled in the art.

In the present disclosure, a nitrogen source, a boron source, a solvent, and a silica aerogel powder are heated and mixed to obtain a hot mixture, the solvent being capable of dissolving the nitrogen source and the boron source.

In some embodiments of the present disclosure, the nitrogen source is one or more selected from the group consisting of dicyandiamide, $(NH_4)_2SO_4$, melamine, and urea, and preferably melamine.

In some embodiments of the present disclosure, the boron source is one or more selected from the group consisting of boron trioxide, ammonium borate, borax, boric acid, and $NaBH_4$, and preferably boric acid.

In some embodiments of the present disclosure, the solvent is a mixed solvent. In some embodiments, the mixed solvent includes water and a hydroxyl compound. In some embodiments, the hydroxyl compound includes one or more selected from the group consisting of methanol, ethanol, ethylene glycol, benzyl alcohol, tert-butanol, phenol, and cresol, and preferably tert-butanol.

In some embodiments of the present disclosure, the water is deionized water.

In some embodiments of the present disclosure, a molar ratio of the nitrogen source, the boron source and the water in the mixed solvent is in a range of (1-5):(0.2-6):(70-750).

In the present disclosure, there is no particular limitation on a volume ratio of the water in the mixed solvent to the hydroxyl compound.

In some embodiments of the present disclosure, the silica aerogel powder includes a single-component silica aerogel and/or a silica composite aerogel.

In some embodiments of the present disclosure, the silica aerogel is a hydrophobic silica aerogel.

In some embodiments of the present disclosure, the silica aerogel powder has a particle size of not larger than 5 μm, and preferably 5 μm.

In some embodiments of the present disclosure, a mass ratio of the silica aerogel powder to the boron source is in a range of (1-10):(1-10), preferably (1.5-8):(1.5-8), and more preferably (2-7):(2-7).

In some embodiments of the present disclosure, the mixing includes the following steps: dissolving the nitrogen source and the boron source in a hot solvent to obtain a hot mixed solution A; and stirring and mixing the silica aerogel powder and the hot mixed solution A to obtain a hot mixture. In some embodiments of the present disclosure, a temperature of the hot solvent is in a range of 80° C. to 95° C. In some embodiments, the dissolving is conducted under stirring. In some embodiments, the stirring is conducted for 5-30 min.

In the present disclosure, after the hot mixture is obtained, a graphite felt is impregnated in the hot mixture, and cooled to obtain a gel felt.

In some embodiments of the present disclosure, the graphite felt includes any one selected from the group consisting of an asphalt-based graphite felt, a polyacrylonitrile-based graphite felt, and a viscose-based graphite felt.

In some embodiments of the present disclosure, the graphite felt has a specific surface area of 100-1,500 m$^2$/g, preferably 300-1,000 m$^2$/g, and more preferably 350-800 m$^2$/g. In some embodiments, the graphite felt has a bulk density of 0.05-0.5 g/cm$^3$, preferably 0.1-0.4 g/cm$^3$, and more preferably 0.15-0.3 g/cm$^3$.

In some embodiments of the present disclosure, the impregnating is performed by ultrasonic concussion-assisted impregnation. In some embodiments, and the ultrasonic concussion-assisted impregnation is conducted for 1-20 min, and preferably 5-15 min.

In some embodiments of the present disclosure, the cooling is conducted at a temperature of −196° C. to 60° C., and preferably −100° C. to 30° C.

In the present disclosure, after the gel felt is obtained, the solvent in the gel felt is removed to obtain an aerogel felt.

In some embodiments of the present disclosure, a means for removing the solvent includes any one or a combination of at least two selected from the group consisting of supercritical drying, ambient pressure drying, and freeze-drying.

In some embodiments of the present disclosure, the ambient pressure drying is conducted at a temperature of 80° C. to 150° C., and preferably 85° C. to 140° C. In some embodiments, the ambient pressure drying is performed at the temperature for 24-72 h, and preferably 36-48 h.

In some embodiments of the present disclosure, the freeze-drying is performed by pre-freezing at a temperature of −80° C. to 0° C., preferably −30° C. to −5° C., and more preferably −25° C. to −10° C. for 1-12 h, and preferably 2-10 h; and then freeze-drying for 12-72 h, and preferably 36-48 h.

In some embodiments of the present disclosure, the supercritical drying is conducted at a temperature of 35° C. to 45° C., and preferably 38° C. to 42° C. In some embodiments, the supercritical drying is conducted at a pressure of 9-14 MPa, and preferably 10-13 MPa. In some embodiments, the supercritical drying is conducted for 8-36 h, and preferably 12-24 h.

In the present disclosure, after obtaining the aerogel felt, in a protective atmosphere or in vacuum, the aerogel felt is heated for a pyrolytic reaction to obtain the thermally insulating SiC—BN aerogel felt.

In some embodiments of the present disclosure, the protective atmosphere is one or more selected from the group consisting of argon atmosphere, nitrogen atmosphere, and ammonia atmosphere, and preferably argon atmosphere.

In some embodiments of the present disclosure, the pyrolytic reaction is conducted at a temperature of 1,050° C. to 1,650° C., preferably 1,100° C. to 1,600° C., and further preferably 1,150° C. to 1,400° C. In some embodiments, the reaction is performed at the temperature for 0.5-4 h, preferably 1-3.5 h, and more preferably 1.5-3 h.

In the present disclosure, when the pyrolytic reaction is conducted, the silica aerogel can undergo pyrolysis at high temperatures to yield SiO and CO gases, which react with the graphite felt: SiO (g)+2C(s)→SiC(s)+CO (g), and SiO$_2$ (s)+CO (g)→SiO (g)+CO$_2$ (g).

The present disclosure provides a thermally insulating SiC—BN aerogel felt prepared by the method according to the foregoing technical solutions, including a felt formed by graphite and SiC nanofibers, and BN supported on the felt.

The present disclosure provides use of the thermally insulating SiC—BN aerogel felt according to the foregoing technical solutions as a thermally insulating and flame-retardant material.

The thermally insulating SiC—BN aerogel felt according to the present disclosure has good thermal insulation, flexibility, tailorability, flame retardance, and ultra-high temperature resistance, and overcomes pain points of aerogel felts on the market, such as powder shedding and difficulty in long-term use at high temperatures.

In order to further illustrate the present disclosure, the technical solutions provided by the present disclosure will be described in detail below in conjunction with accompanying drawings and examples, but they should not be construed as limiting the scope of the present disclosure.

Example 1

Figure 1:
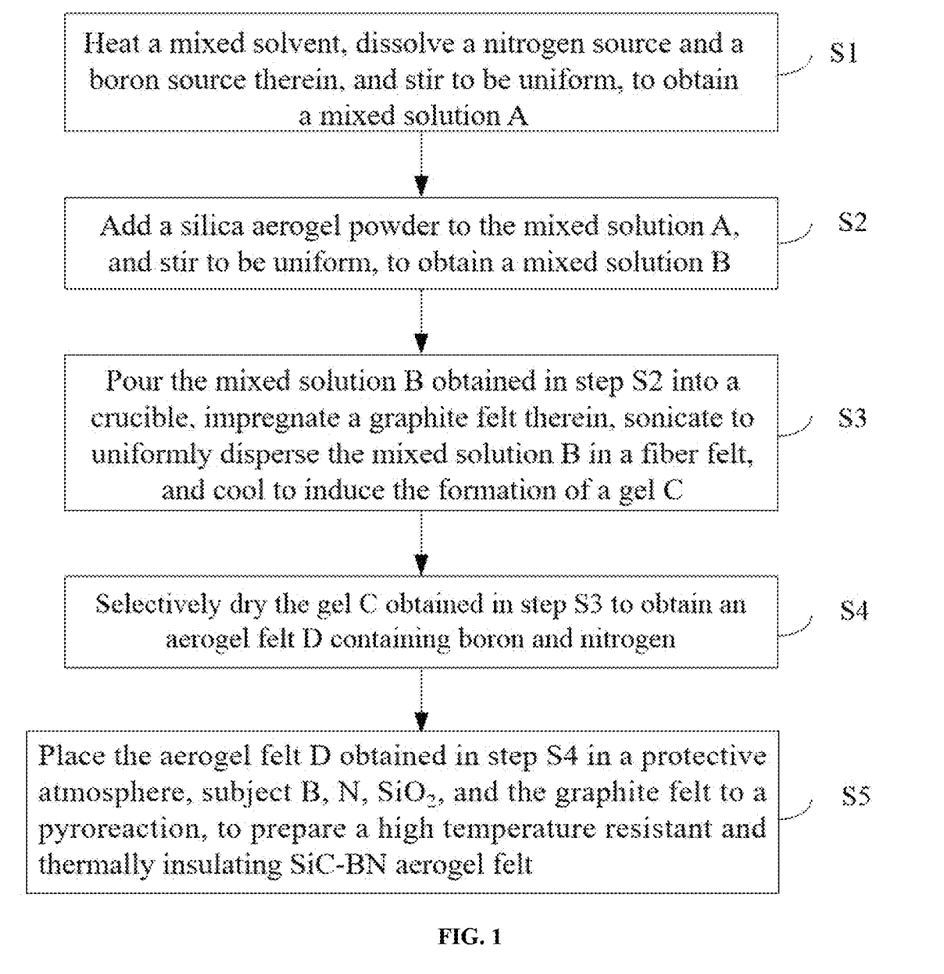
FIG. 1 shows a flow chart of a method for preparing a thermally insulating SiC—BN aerogel felt according to an embodiment of the present disclosure.

As shown in FIG. 1, this example provided a method for preparing a high temperature resistant and thermally insulating SiC—BN aerogel felt, which was performed as follows:

S1, A mixed solvent of 50 mL of deionized water and 70 mL of tert-butanol was heated to 85° C., and 1.2 g of melamine and 1.2 g of boric acid were dissolved in the mixed solvent and stirred to be uniform, obtaining a mixed solution A.

S2, 0.5 g of single-component silica aerogel was added to the mixed solution A and stirred to be uniform, obtaining a mixed solution B (the temperature of the mixed solution B was 85° C.).

S3, The mixed solution B obtained in step S2 was poured into a crucible, and a graphite felt was impregnated therein. The resulting mixture was subjected to ultrasonic concussion to uniformly disperse B in the graphite felt, and cooled to induce the formation of a gel C, wherein an asphalt-based graphite felt with a specific surface area of 451 m²/g and a bulk density of 0.17 g/cm³ was selected as the graphite felt, the cooling was performed at 25° C., and the ultrasonic sonication was performed for 5 min.

S4, The gel C obtained in step S3 was freeze-dried (i.e., pre-freezing at −20° C., and then freeze-drying for 48 h), obtaining an aerogel felt D.

S5, In a protective atmosphere, B, N, $SiO_2$, and the graphite felt in the aerogel felt D obtained in step S4 underwent a pyroreaction, obtaining a high temperature resistant and thermally insulating SiC—BN aerogel felt, wherein the protective atmosphere was provided by argon (Ar), the pyroreaction was performed at a temperature of 1,200° C. for 3 h, and the resulting high temperature resistant and thermally insulating SiC—BN aerogel felt was labeled as sample 1.

Figure 2:
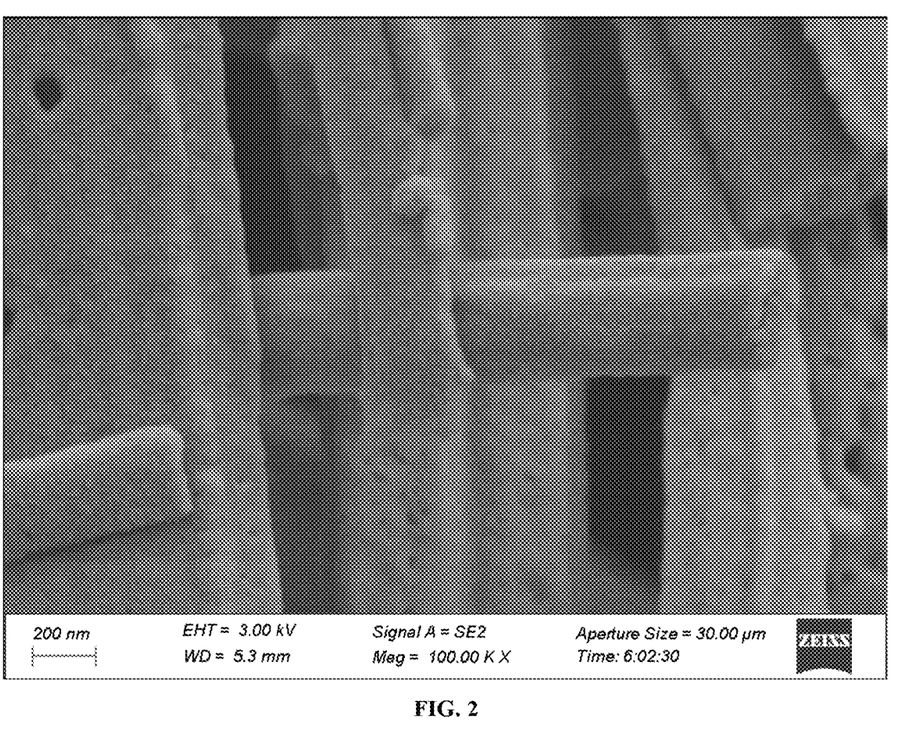
FIG. 2 is a scanning electron microscope (SEM) image of the thermally insulating SiC—BN aerogel felt prepared in Example 1 of the present disclosure.

The SEM image of the high temperature resistant and thermally insulating SiC—BN aerogel felt obtained in this example is shown in FIG. 2.

Example 2

This example was performed substantially the same as Example 1, except for the differences as follows: the asphalt-based graphite felt in step S3 of Example 1 was replaced with a viscose-based graphite felt; and the prepared high temperature resistant and thermally insulating SiC—BN aerogel felt was labeled as sample 2.

Example 3

This example was performed substantially the same as Example 1, except for the differences as follows: the asphalt-based graphite felt in step S3 of Example 1 was replaced with a polyacrylonitrile-based graphite felt; and the prepared high temperature resistant and thermally insulating SiC—BN aerogel felt was labeled as sample 3.

Example 4

This example was performed substantially the same as Example 1, except for the differences as follows: different from the step S5 of Example 1, the pyroreaction was performed at 1,250° C.; and the prepared high temperature resistant and thermally insulating SiC—BN aerogel felt was labeled as sample 4.

Example 5

This example was performed substantially the same as Example 4, except for the differences: the asphalt-based graphite felt in step S3 of Example 4 was replaced with a viscose-based graphite felt; and the prepared high temperature resistant and thermally insulating SiC—BN aerogel felt was labeled as sample 5.

Example 6

This example was performed substantially the same as Example 4, except for the differences as follows: the asphalt-based graphite felt in step S3 of Example 4 was replaced with a polyacrylonitrile-based graphite felt; and the prepared high temperature resistant and thermally insulating SiC—BN aerogel felt was labeled as sample 6.

Example 7

This example was performed substantially the same as Example 4, except for the differences as follows: 1.2 g of boric acid in step S1 of Example 4 was replaced with 1 g of boron trioxide; and the prepared high temperature resistant and thermally insulating SiC—BN aerogel felt was labeled as sample 7.

Example 8

This example was performed substantially the same as Example 7, except for the differences as follows: the asphalt-based graphite felt in step S3 of Example 7 was replaced with a viscose-based graphite felt; and the prepared high temperature resistant and thermally insulating SiC—BN aerogel felt was labeled as sample 8.

Example 9

This example was performed substantially the same as Example 7, except for the differences as follows: the asphalt-based graphite felt in step S3 of Example 7 was replaced with a polyacrylonitrile-based graphite felt; and the prepared high temperature resistant and thermally insulating SiC—BN aerogel felt was labeled as sample 9.

Example 10

This example was performed substantially the same as Example 4, except for the differences as follows: 1.2 g of boric acid in step S1 of Example 4 was replaced with 0.9 g of ammonium borate, while different from the step S5 of Example 4, the pyroreaction was performed at 1,150° C., and the prepared high temperature resistant and thermally insulating SiC—BN aerogel felt was labeled as sample 10.

Example 11

This example was performed substantially the same as Example 10, except for the differences as follows: the asphalt-based graphite felt in step S3 of Example 10 was replaced with a viscose-based graphite felt; and the prepared high temperature resistant and thermally insulating SiC—BN aerogel felt was labeled as sample 11.

Example 12

This example was performed substantially the same as Example 10, except for the differences as follows: the asphalt-based graphite felt in step S3 of Example 10 was replaced with a polyacrylonitrile-based graphite felt; and the prepared high temperature resistant and thermally insulating SiC—BN aerogel felt was labeled as sample 12.

Example 13

This example was performed substantially the same as Example 1, except for the differences as follows: the mixed solvent of 50 mL of deionized water and 70 mL of tert-butanol in step S1 of Example 1 was replaced with a mixed solvent of 70 mL of deionized water and 50 mL of tert-butanol; and the prepared high temperature resistant and thermally insulating SiC—BN aerogel felt was labeled as sample 13.

Example 14

This example was performed substantially the same as Example 13, except for the differences as follows: the asphalt-based graphite felt in step S3 of Example 13 was replaced with a viscose-based graphite felt; and the prepared high temperature resistant and thermally insulating SiC—BN aerogel felt was labeled as sample 14.

Example 15

This example was performed substantially the same as Example 13, except for the differences as follows: the asphalt-based graphite felt in step S3 of Example 13 was replaced with a polyacrylonitrile-based graphite felt; and the prepared high temperature resistant and thermally insulating SiC—BN aerogel felt was labeled as sample 15.

Comparative Example 1

S1, 90 mL of deionized water was heated to 85° C., and 1.63 g of melamine and 1.58 g of boric acid were dissolved therein and stirred to be uniform, obtaining a mixed solution.

S2, The mixed solution was subjected to ultrasonic concussion and simultaneously cooled naturally to room temperature to form a gel.

S3, The gel was pre-frozen at −20° C. and then freeze-dried for 48 h, obtaining a BN aerogel precursor.

S4, The BN aerogel precursor was maintained at 1,200° C. in an Ar atmosphere for 3 h, obtaining a high temperature resistant and thermally insulating BN aerogel.

Figure 3:
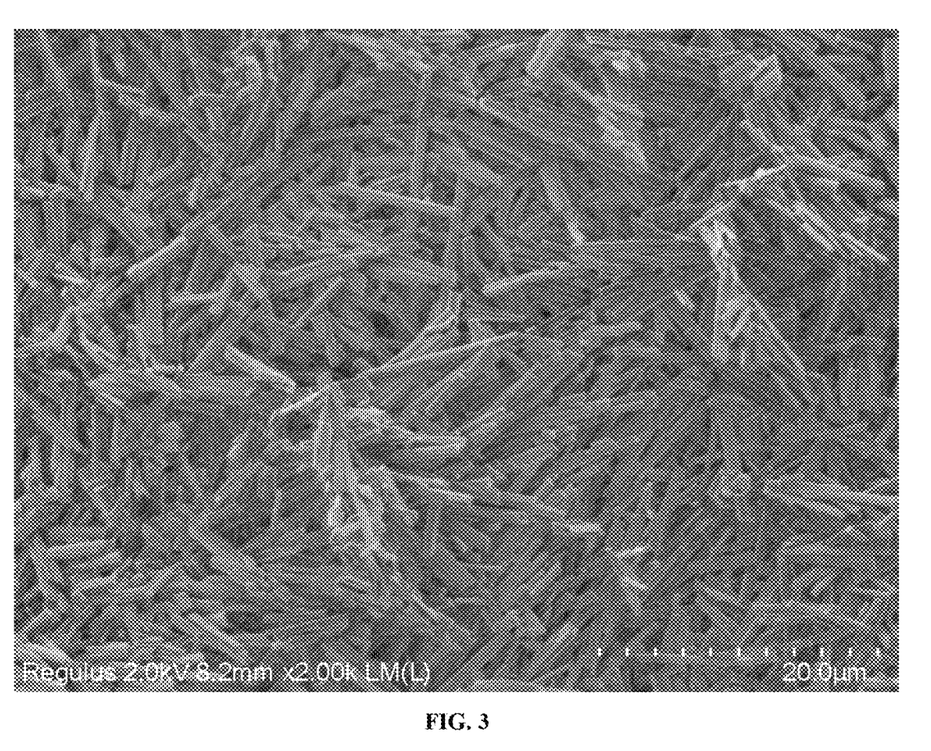
FIG. 3 is an SEM image of the BN aerogel prepared in Comparative Example 1 of the present disclosure.

The SEM image of the BN aerogel obtained in this comparative example is shown in FIG. 3.

The properties of aerogels prepared in Examples 1 to 15 and Comparative Example 1 are shown in Table 1. Visibly, the high temperature resistant and thermally insulating SiC—BN aerogel felt prepared in the present disclosure has good thermal insulation performance and temperature resistance.

TABLE 1

Properties results of the high temperature resistant and thermally insulating SiC—BN aerogel felts obtained in Examples 1 to 15

| Example | Specific surface area ($m^2/g$) | Temperature resistance in air (° C.) | Thermal conductivity (W $m^{-1}$ $K^{-1}$) |
|---|---|---|---|
| 1 | 432.25 | 1200 | 0.0261 |
| 2 | 368.57 | 1200 | 0.0263 |
| 3 | 402.56 | 1200 | 0.0268 |
| 4 | 682.32 | 1300 | 0.0235 |
| 5 | 623.54 | 1300 | 0.0237 |
| 6 | 642.32 | 1300 | 0.0231 |
| 7 | 653.32 | 1300 | 0.0215 |
| 8 | 598.32 | 1300 | 0.0221 |
| 9 | 613.23 | 1300 | 0.0213 |
| 10 | 456.36 | 1250 | 0.0255 |
| 11 | 432.12 | 1250 | 0.0252 |
| 12 | 495.23 | 1250 | 0.0253 |
| 13 | 351.23 | 1200 | 0.0271 |
| 14 | 384.56 | 1200 | 0.0269 |
| 15 | 342.11 | 1200 | 0.0272 |

Although the above embodiments describe the present disclosure in detail, they are only a part of, not all of, the embodiments of the present disclosure. Other embodiments can be further obtained based on these embodiments without creative labor, and all of these embodiments shall fall within the scope of the present disclosure.

What is claimed is:

1. A method for preparing a thermally insulating SiC—BN aerogel felt, comprising the steps of
   heating and mixing a nitrogen source, a boron source, a solvent, and a silica aerogel powder to obtain a hot mixture, wherein the solvent is capable of dissolving the nitrogen source and the boron source;
   impregnating a graphite felt in the hot mixture, and cooling to obtain a gel felt;
   removing the solvent from the gel felt to obtain an aerogel felt; and
   in a protective atmosphere or in vacuum, heating the aerogel felt for a pyrolytic reaction to obtain the thermally insulating SiC—BN aerogel felt.

2. The method as claimed in claim 1, wherein
   the nitrogen source is one or more selected from the group consisting of dicyandiamide, $(NH_4)_2SO_4$, melamine, and urea;
   the boron source is one or more selected from the group consisting of boron trioxide, ammonium borate, borax, boric acid, and $NaBH_4$;
   the solvent is a mixed solvent that comprises water and a hydroxyl compound, the hydroxyl compound comprising one or more selected from the group consisting of methanol, ethanol, ethylene glycol, benzyl alcohol, tert-butanol, phenol, and cresol; and
   a molar ratio of the nitrogen source, the boron source and the water in the mixed solvent is in a range of (1-5):(0.2-6):(70-750).

3. The method as claimed in claim 1, wherein
   a temperature of the hot mixture is in a range of 80-95° C.;
   the impregnating is performed by ultrasonic concussion-assisted impregnation, and the ultrasonic concussion-assisted impregnation is conducted for 1-20 min; and
   the cooling is conducted at a temperature of −196° C. to 60° C.

4. The method as claimed in claim 1, wherein
   the silica aerogel powder comprises a single-component silica aerogel and/or a silica composite aerogel; and
   a mass ratio of the silica aerogel powder to the boron source is in a range of (1-10):(1-10).

5. The method as claimed in claim 4, wherein the silica aerogel powder has a particle size of not larger than 5 μm.

6. The method as claimed in claim 1, wherein the silica aerogel powder has a particle size of not larger than 5 μm.

7. The method as claimed in claim 1, wherein the graphite felt comprises any one selected from the group consisting of an asphalt-based graphite felt, a polyacrylonitrile-based graphite felt, and a viscose-based graphite felt.

8. The method as claimed in claim 7, wherein the graphite felt has a specific surface area of 100-1,500 $m^2/g$ and a bulk density of 0.05-0.5 $g/cm^3$.

9. The method as claimed in claim 7, wherein the graphite felt has a bulk density of 0.05-0.5 $g/cm^3$.

10. The method as claimed in claim 1, wherein the graphite felt has a specific surface area of 100-1,500 $m^2/g$ and a bulk density of 0.05-0.5 $g/cm^3$.

11. The method as claimed in claim 1, wherein the graphite felt has a bulk density of 0.05-0.5 $g/cm^3$.

12. The method as claimed in claim 1, wherein a means for removing the solvent comprises any one or a combination of at least two selected from the group consisting of supercritical drying, ambient pressure drying, and freeze-drying, wherein
- the ambient pressure drying is conducted at a temperature of 80-150° C. for 24-72 h;
- the freeze-drying is performed by pre-freezing at a temperature of −80° C. to 0° C. for 1-12 h, and then freeze-drying for 12-72 h; and
- the supercritical drying is conducted at a temperature of 35-45° C. and a pressure of 9-14 MPa for 8-36 h.

13. The method as claimed in claim 1, wherein
- the protective atmosphere is one or more selected from the group consisting of argon atmosphere, nitrogen atmosphere, and ammonia atmosphere; and
- the pyrolytic reaction is conducted at a temperature of 1,050-1,650° C. for 0.5-4 h.

14. A thermally insulating SiC—BN aerogel felt prepared by the method as claimed in claim 1, comprising a felt formed by graphite and SiC nanofiber, and BN supported on the felt.

15. A method for preparing a thermally insulating and flame-retardant material, comprising
- using the thermally insulating SiC—BN aerogel felt as claimed in claim 14 to prepare the thermally insulating and flame-retardant material.

* * * * *